(12) United States Patent
Goel et al.

(10) Patent No.: US 10,277,474 B2
(45) Date of Patent: Apr. 30, 2019

(54) COMPUTER NETWORK PLANNING

(71) Applicant: Facebook, Inc., Menlo Park, CA (US)

(72) Inventors: Nitin Kumar Goel, Mountain View, CA (US); Josue Israel Kuri Obregon, Sunnyvale, CA (US); Alexander Ilo Nikolaidis, Redwood City, CA (US); Yury Smirnov, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 180 days.

(21) Appl. No.: 15/194,011

(22) Filed: Jun. 27, 2016

(65) Prior Publication Data

US 2017/0373943 A1    Dec. 28, 2017

(51) Int. Cl.
*G06F 15/177* (2006.01)
*H04L 12/24* (2006.01)
*H04W 16/18* (2009.01)

(52) U.S. Cl.
CPC ........ *H04L 41/145* (2013.01); *H04L 41/0806* (2013.01); *H04L 41/12* (2013.01); *H04W 16/18* (2013.01); *H04L 41/04* (2013.01); *H04L 41/08* (2013.01); *H04L 41/0803* (2013.01); *H04L 41/083* (2013.01); *H04L 41/0823* (2013.01); *H04L 41/0833* (2013.01); *H04L 41/0896* (2013.01); *H04L 41/14* (2013.01)

(58) Field of Classification Search
CPC ......... H04L 41/04; H04L 41/12; H04L 41/14; H04L 41/145; H04L 41/08; H04L 41/0803; H04L 41/0806; H04L 41/0896; H04L 41/0823; H04L 41/083; H04L 41/0833; H04W 16/18

USPC .................. 370/254; 709/220, 221, 222, 223
See application file for complete search history.

(56) References Cited

U.S. PATENT DOCUMENTS

| | | | | |
|---|---|---|---|---|
| 6,141,318 A | * | 10/2000 | Miyao | H04L 41/145 370/217 |
| 2008/0101242 A1 | * | 5/2008 | Sadler | H04L 41/0896 370/238 |
| 2010/0214920 A1 | * | 8/2010 | Tewani | H04L 45/22 370/232 |
| 2013/0287391 A1 | * | 10/2013 | Klincewicz | H04L 41/145 398/34 |
| 2014/0169187 A1 | * | 6/2014 | Jenkins | H04L 41/145 370/252 |
| 2016/0112326 A1 | * | 4/2016 | Farmanbar | H04L 47/18 370/230.1 |
| 2017/0012856 A1 | * | 1/2017 | Zhao | H04L 45/12 |
| 2017/0331694 A1 | * | 11/2017 | Crickett | H04L 41/0896 |

* cited by examiner

*Primary Examiner* — Liang Che A Wang
*Assistant Examiner* — Johnny B Aguiar
(74) *Attorney, Agent, or Firm* — FisherBroyles, LLP (57) ABSTRACT

The disclosure is directed to a network planning tool for planning a topology of a computer network, e.g., for provisioning network capacity. The network planning tool evaluates various factors, e.g., demand projections between a pair of nodes, existing network topology, existing circuits, failure scenarios, and other constraints, and generates a set of circuits that satisfies various demand projections. The set of circuits is robust under failure scenarios and minimizes latency, costs and/or power consumption involved in satisfying the demand projections. The tool assigns each of the circuits to a spectral resource of a physical communication link, e.g., a wavelength of a fiber optic cable, using which it can propagate data traffic between the pair of nodes.

19 Claims, 6 Drawing Sheets

COMPUTER NETWORK PLANNING

BACKGROUND

Certain entities, such as large corporations, government agencies, or universities, may maintain a backbone network (also referred to as a "computer network") to interconnect entity assets. For example, a corporate backbone network may be used to connect different data centers maintained by a corporation. Backbone networks may additionally include one or more points of presence for connecting the backbone network to the Internet. Backbones networks are themselves made up of connectivity devices, such as hubs, switches, and routers, as well as cables to connect the connectivity devices. These components of the backbone network provide the network capacity by which the network demand between assets (e.g., from data center to data center) may be satisfied.

To increase backbone network capacity, an entity's network planners may engage in both short-term operational planning and long-term strategic planning. In the short-term, network planners may, for example, acquire additional capacity from an existing cable in the backbone network that has unused capacity, such as by paying for increased cable capacity. In the long-term, network planners may utilize new cables in the backbone network, thereby adding new routes between data centers in the network or augmenting existing routes between data centers.

Traditionally, the long-term planning done by network planners has been driven by the availability of new supply. That is, as new cables have been laid, network planners have had to decide whether to negotiate for use of the new cables, either through leasing access to the cables or joining a consortium of entities that manage the cable. These decisions have typically been made by network planners based on the current network demands of their backbone networks. In other words, the decisions behind long-term strategic planning have been made by network planners based primarily on the state of the backbone network at that particular time. Such limited input into long-term decision making is inherently inefficient, and risks the ability of the backbone network to meet future network demands. The currently available tools for network planning are inefficient. The planning of network can include planning a transport layer of the network, e.g., physical link layer such as laying of fiber optics, their capacities, and an Internet Protocol (IP) layer, e.g., placement of routers in the network, how the routers have to be connected. The current tools typically facilitate planning one layer or the other and do not support multi-layer planning. It would therefore be beneficial to facilitate strategic planning of a backbone network.

DETAILED DESCRIPTION

Embodiments are directed to a network planning tool for planning a topology of a computer network, e.g., for provisioning network capacity. The tool facilitates designing a set of circuits with the bandwidth that exceeds the projected demand even under a number of failure scenarios. The network-planning tool evaluates various factors for provisioning network capacity. For example, the network-planning tool considers demand projections of network capacity between a pair of nodes in the computer network, existing network topology, existing circuits, failure scenarios, and capacity constraints of physical communication links between the nodes. Further, the network planning tool provisions the network capacity subject to various constraints, e.g., permissible latency, costs, power consumption.

The network-planning tool includes a circuit generation component and a spectral resource assignment component. The circuit generation component aids in designing the topology of the computer network, e.g., in determining circuits, which is a path to be taken by the data traffic from a source node to a destination node. In some embodiments, a circuit is characterized by a source node and a destination node, a path of the circuit, a channel or a super-channel, and a maximum network capacity, e.g., network bandwidth, supported by the circuit. The source node is a node in the computer network at which the circuit originates and the destination node is a node at which the circuit terminates. The circuit propagates data between the source and destination nodes. The path of the circuit can include various nodes and physical communication links or communication cables, e.g., fiber optic cables, between the source and destination nodes through which the data traffic propagates. The channel is one of the channels of the physical communication links using which the circuit propagates the data. In some embodiments, a communication cable includes multiple channels and data can be transmitted through these multiple channels, e.g., simultaneously or sequentially, thereby increasing the capacity of the physical communication link. For example, if the physical communication link is a fiber optic cable, a channel can be a particular wavelength using which the circuit transmits the data. In some embodiments, multiple channels can be combined to form a super-channel and a circuit can be assigned to the super-channel. A super-channel is an evolution in Dense Wavelength Division Multiplexing (DWDM) in which multiple, coherent optical carriers are combined to create a unified channel of a higher data rate. A channel and/or a super-channel is part of a spectral resource of a physical communication link. Henceforth, a "spectral resource" is meant to include a channel and/or a super-channel of a physical communication link.

The circuit generation component considers various factors, e.g., projections of network capacity demand between a pair of nodes in the computer network, existing network topology, existing circuits, failure scenarios, capacity constraints of physical communication links between the nodes, and generates circuits that can satisfy the projected demand in the computer network. The circuit generation tool determines the circuits subject to various constraints, e.g., permissible latency, costs, power consumption etc. For example, the circuits are generated such that a latency of the circuit is below a specified value.

The spectral resource assignment component assigns different spectral resources, e.g., channels or super-channels of the physical communication link, to different circuits. In some embodiments, an objective of the spectral resource assignment component is to assign to each of the circuits generated by the circuit generation component a spectral resource, e.g., one of the channels or super-channels, subject to one or more constraints. The one or more constraints can include a type of a node in the circuit and constraints of the physical communication links in the circuit. For example, a circuit that passes through a transit type node can be assigned to only one channel or a super-channel and not more. Other types of a node include a second type in which there can be one circuit passing through the node and another originating at the node, and a circuit that is passing through such a node can be assigned to only a channel or a super-channel, whereas a circuit that originates at the node can be assigned to any of the available spectral resources. Regarding physical link constraints, one physical communication link can have less number of spectral resources than another physical communication link in the circuit and/or may have less network capacity than the other, and therefore, the circuit may have to be assigned to the spectral resource accordingly.

In some embodiments, if the spectral resource assignment component does not meet the objective of assigning all the circuits to the spectral resources, e.g., there are some circuits that are not assigned to any of the spectral resources, then this information is fed back to the circuit generation component, which regenerates the circuits based on the feedback. The circuit generation component generates a different set of circuits, which are then assigned to spectral resources by the spectral resource assignment component. The process of generating the circuits, assigning the circuits to the spectral resources, feeding back the circuits to the circuit generation component can be repeated until all or at least a specified number of the generated circuits are assigned to the spectral resources.

The network planning tool can be used to plan a new computer network, e.g., a computer network which has no circuits in place (referred to as "Greenfield" planning), or alter an existing computer network which has some circuits (referred to as "Brownfield" planning). In the case of Greenfield planning, the circuit generation component generates new circuits, and the spectral resource assignment component assigns the circuits to any of the spectral resources of the physical communication links. In the case of Brownfield planning, the circuit generation component can (a) augment one or more of the existing circuits with additional capacities to generate new augmented circuits, (b) decrease the capacity of one or more of the existing circuits, thereby releasing some capacity, which can also be used for provisioning the augmented circuits, and/or (c) leave the capacities of one or more of the circuits unchanged. The spectral resource assignment component assigns the newly generated circuits to any of the remaining or available spectral resources.

To summarize, the network planning tool generates a capacity-provisioning plan, based on the network characterization data and failure data, that provides guidance regarding how much capacity should be provisioned (e.g., leased or built-out) from the physical links in the computer network. The capacity-provisioning plan includes the circuits, capacity to be provisioned to each of the circuits, and the assignment of the circuits to the channels of the physical communication links. The generated capacity-provisioning plan may satisfy some constraints. For example, the capacity-provisioning plan satisfies the projected network capacity demand, provide fault-tolerance against various failure scenarios, and minimize one or more of latency, costs and power consumption.

The disclosed network-planning tool has several advantages. Although some of those advantages are described in this disclosure, not all advantages are required in each implementation of the disclosed embodiments. Additionally, some advantages will become apparent to those having ordinary skill in the art after reviewing the disclosure. One advantage of the network-planning tool is that it enables effective long-term planning by evaluated long-term projections regarding network capacity demand and costs. By generating a plan implemented over a long duration (e.g., every fiscal quarter for ten years), the system can realize some efficiencies over alternative short-term planning. For example, the network-planning tool can evaluate how the network would respond to different failure scenarios. By doing so, the system may generate a capacity-provisioning plan that constitutes to satisfy network capacity demand even if a cable suffers a failure.

Figure 1:
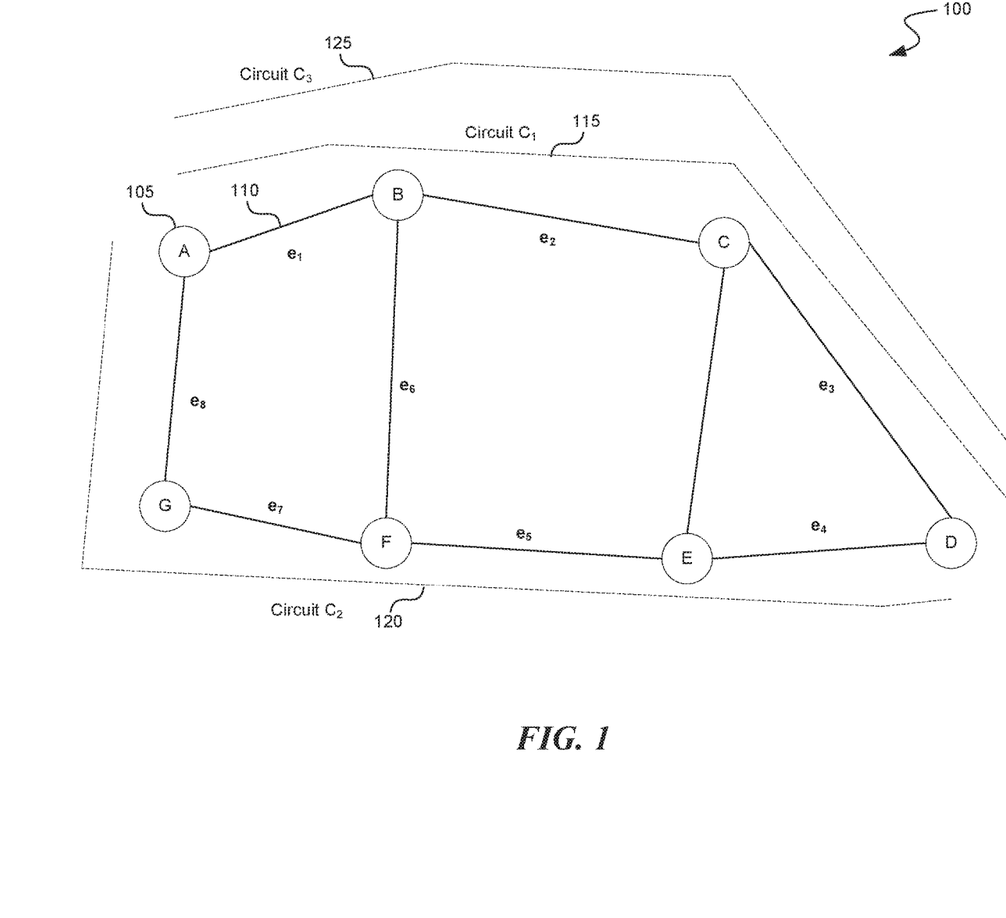
FIG. 1 is a block diagram illustrating a topology of a computer network in which the disclosed embodiments may be implemented.

Turning now to the figures, FIG. 1 is a block diagram illustrating a topology of a computer network 100 in which the disclosed embodiments may be implemented. The computer network 100 includes multiple nodes, e.g., node 105, between which data traffic is propagated. In some embodiments, a computer network "node," as used herein, refers to an asset interconnected by the computer network 100. For example, a node may represent a data center, a point of presence, or other computing device connected by the computer network. As described herein, nodes have demand requirements with respect to other nodes based on the network traffic requirements as between the nodes.

A node can be connected to another node via a physical communication link (also referred to as "link"), e.g., link $e_1$ 110. The link is an undivided path between a pair of nodes in the computer network 100 that enables a route for data traffic propagation between them, e.g., link $e_1$ 110 enables a route from node A to node B. The link may be implemented as a cable, e.g., as an optical fiber cable or other physical cable used in data networks. As described herein, a link may have a maximum available capacity, a provisioned capacity to which an entity is entitled, and a utilized capacity. Different links in the computer network 100 can have different maximum available capacities. The links may additionally be characterized by their asset type. In some implementations, each link is characterized as either a lease or an investment.

A circuit, as used herein, is a logical path for propagating data traffic from a source node to a destination node, and includes one or more other nodes and links through which the data traffic is propagated from the source node to the destination node. Some circuits are bi-directional and can propagate data between the end nodes. A circuit is composed of links, each of which represents a point-to-point undivided path. For example, a circuit $C_1$ 115 originates at source node A and terminates at destination node D, and includes links $e_1$, $e_2$, and $e_3$, and passes through nodes B and C. A link may be part of multiple circuits. For example, the links $e_1$, $e_2$, and $e_3$, are part of two circuits $C_1$ 115 and $C_3$ 125. Note that the circuit $C_3$ depicted in FIG. 1 may be just a portion of the entire circuit $C_3$ which originates and terminates at nodes different from what is illustrated. Further, a pair of nodes may have more than one circuit originating and terminating between them but which are of different paths, e.g., to provide redundancy and/or to overcome a failure of a link in one of the circuits. For example, circuits $C_1$ 115 and $C_2$ 120 both originate at node A and terminate at node D. The data traffic can be propagated from node A to node D using circuit $C_2$ 120 in case one or more links in circuit $C_1$ 115 experience a failure.

In some embodiments, a circuit is characterized by a source node and a destination node, spectral resources along the path traversed by the circuit, and a maximum network capacity, e.g., network bandwidth, supported by the circuit. The source node is a node in the computer network 100 at which the circuit originates and the destination node is a node at which the circuit terminates.

The topology of the computer network 100 may have to be altered, e.g., improved, to handle additional demand as the demand for network capacity grows over time. The improvement can include adding additional circuits to handle the additional demand, reassigning capacity from one circuit to another to balance the capacity based on the actual usage, adding additional links, replacing existing links with higher capacity links, altering the circuits to handle new failure scenarios, etc.

Figure 2:
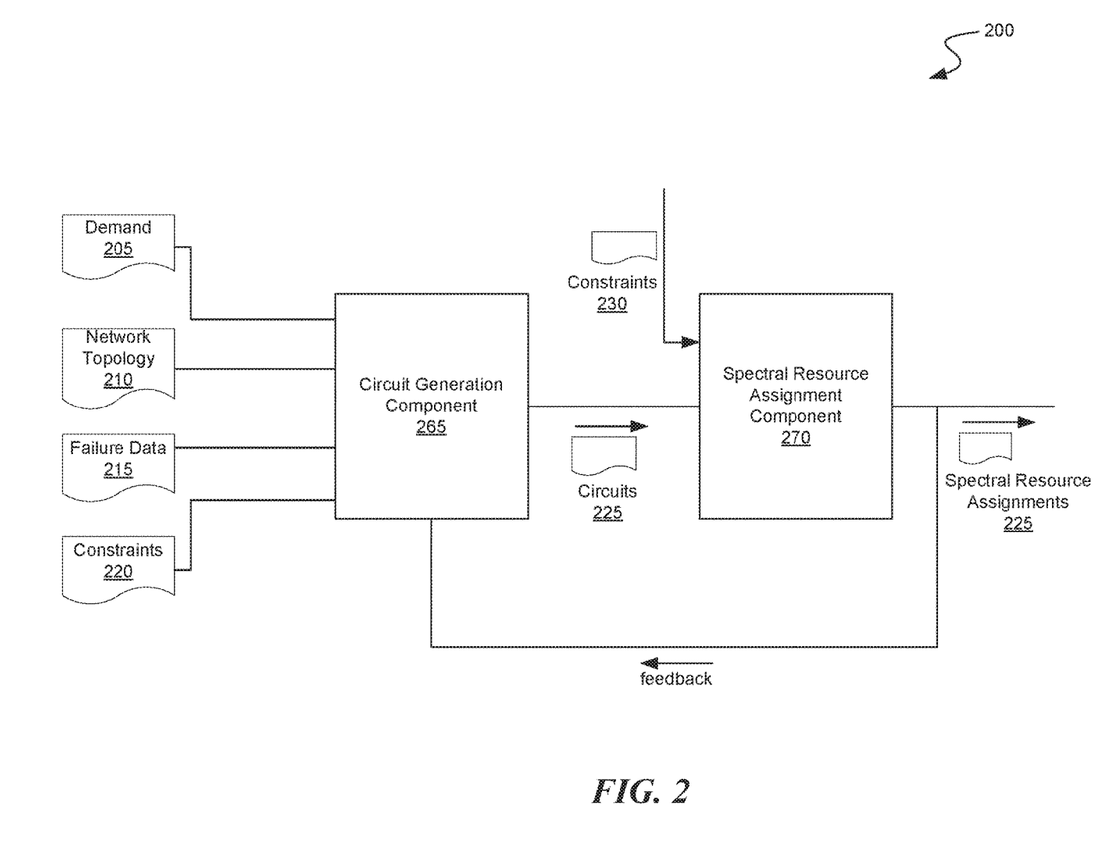
FIG. 2 is a block diagram of a network-planning tool for planning a topology of the computer network, consistent with various embodiments.

FIG. 2 is a block diagram of a network-planning tool 200 for planning a topology of a computer network of FIG. 1, consistent with various embodiments. The network-planning tool 200 includes a circuit generation component 265 and a spectral resource assignment component 270. The circuit generation component 265 aids in designing the topology of the computer network 100, e.g., for provisioning network capacity. In some embodiments, designing the topology includes generating one or more circuits between a pair of nodes that satisfy a projected demand between the pair of nodes while satisfying specified constraints and being robust under various failure scenarios. The generated circuits provide guidance regarding how much capacity should be provisioned to the links, addition of new communication links with specified capacities, addition of new communication nodes, or reconfiguration of the existing links and/or nodes.

The circuit generation component 265 can generate the circuits based on demand data 205, network characterization data and failure data 215. The demand data 205 characterizes demand projections, e.g., projected traffic (also referred to as "projected demand") between different pairs of nodes in the computer network 100. In some embodiments, the demand projection is expressed as a triplet (source node, destination node, projected demand) in which the projected demand is a projected traffic between the source and destination nodes. For example, a demand projection can indicate that projected traffic between node A and node B is 100 gigabits per second (Gbps). The demand data 205 can include multiple such demand projections for different node pairs. In some implementations, the demand data 205 reflects the worst-case traffic projections between the nodes.

The network characterization data describes different aspects of the computer network 100. For example, the network characterization data may include network topology information 210 that describes the topology of the computer network 100, such as a list of nodes in the computer network 100, type of the nodes, a list of links between the nodes, capacities of each of the physical links, whether the links are leased or owned by an entity, and any existing circuits in the computer network 100.

The network characterization data can additionally include constraints data 220. The constraints data 220 can include information regarding one or more of a permissible latency of the computer network 100, e.g., latency involved in propagating data traffic through a specified circuit, financial data such as a permissible cost for implementing the computer network 100, and permissible power consumption by the computer network 100. The financial data can also characterize the costs associated with each link in the computer network 100. In some implementations, the cost associated with a link includes an upfront cost corresponding to when the link becomes operational (i.e., a capital expenditure) and a recurring cost corresponding to each period that the link is utilized by the entity (i.e., an operating expenditure). The capital expenditure and the operating expenditure may further comprise a fixed amount for the link, as well as a variable amount dependent on a capacity of the link. For example, the operating expenditure variable amount and the capital expenditure variable amount may depend on the amount of link capacity provisioned by the entity.

The failure data 215 can include different failure scenarios to be evaluated by the network-planning tool 200. Each failure scenario lists one or more links to be treated as failing, a node failure, a point of presence (PoP) failure, a circuit failure, a shared risk link group (SRLG) failure or a combination of failures for that scenario, and therefore a loss in associated network capacity. For example, a failure scenario corresponding to a trawler accident in the Atlantic Ocean may list one more segments belonging to trans-Atlantic cables, and a failure scenario corresponding to a severe earthquake in the United States may list one or more segments belonging to cables located near the earthquake. In some implementations, the failure data 215 also includes, in addition to failure scenarios modeled on particular accidents or natural disasters, additional failure scenarios to be evaluated by the network-planning tool 200. For example, the failure data 215 may include failure scenarios that collectively list all single-link failures, all two-link failures, etc. In some implementations, for example, the failure data 215 includes failure scenarios corresponding to all two-link failures from links characterized as an investment. For example, with reference to FIG. 1, a single-link failure scenario can be a scenario in which link $e_3$ to a node D fails, and a two-link failure scenario can be a scenario in which links $e_3$ and $e_4$ to node D both fail. Further, a link can be shared between multiple circuits, and therefore, even a single-link failure can affect multiple circuits. When evaluating the computer network 100 under a particular failure scenario, the network planning tool 200 treats those links that are composed of the links listed for that failure scenario as unable to provide any capacity.

The circuit generation component 265 evaluates the demand data 205, the network characterization data and the failure data 215 to generate a capacity provisioning plan, which includes a number of circuits 225 that satisfy the projected demands between various pairs of nodes specified in the demand data 105 even when the failure scenarios specified in the failure data 215 occur, and while satisfying the constraints 220. As mentioned above, the constraints 220 can include one or more of latency, costs and power consumption. So, the circuits 225 are generated such that all constraints are satisfied and in addition the objective function comprised of the latency, cost and power consumption and/or other key network design metrics is minimized. For example, the circuits ensure that one or more of the latency, cost and/or power consumption of the computer network 100 are within the specified limits. In some embodiments, the constraints 220 can be expressed as a function of the latency, cost and power consumption, e.g., ($\alpha L + \beta C + \gamma Co + \delta P$), wherein L is latency, C is capacity, Co is cost and P is power consumption. The circuit generation component 265 can find a Pareto optimal solution based on the constraints 220. In some embodiments, the optimization is performed by the circuit generation component 265 can be a trade-off between latency and capacity of the computer network 100. In some embodiments, the trade-off can be one to one, e.g., the circuit generation component 265 decreases the latency by 1% to increase the capacity by 1%. In some other embodiments, trade-off can be one-to-two or one-to-ten.

The network planning tool 200 can be used for Greenfield planning and/or Brownfield planning. In the case of Greenfield planning, the circuit generation component 265 generates new circuits 225 subject to the demand data 205, the network characterization data and the failure data 215 while satisfying the constraints 220. In the case of Brownfield planning, the circuit generation component 265 can (a) augment one or more of the existing circuits with additional capacities to generate new augmented circuits, (b) decrease the capacity of one or more of the existing circuits, thereby releasing some capacity, which can also be used for provisioning the augmented circuits, or (c) leave the capacities of one or more of the existing circuits unchanged. An example of Brownfield planning is described at least with reference to FIG. 3A below.

Figure 3A:
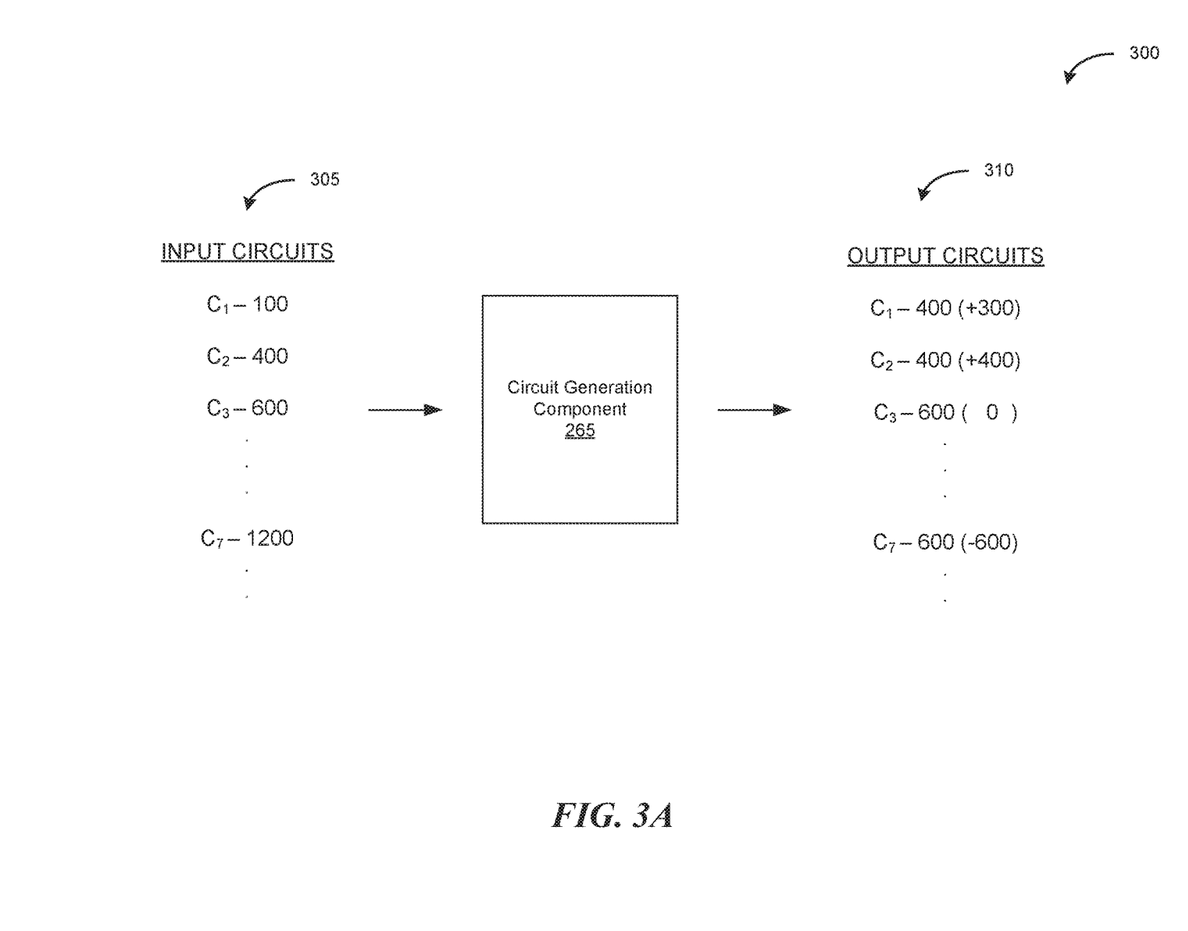
FIG. 3A is a block diagram illustrating an example of inputs and outputs of a circuit generation component of the network planning tool used in Brownfield planning, consistent with various embodiments.

FIG. 3A is a block diagram illustrating an example 300 of inputs and outputs of the circuit generation component 265 of FIG. 2 used in Brownfield planning, consistent with various embodiments. In the example 300, an input 305 to the circuit generation component 265 includes data regarding existing circuits. For example, the input 305 indicates that a circuit $C_1$ has a current capacity of 100 Gbps, a circuit $C_2$ has 400 Gbps and so on. In some embodiments, the data can be the current capacities of the existing circuits in the computer network 100 and can be input as part of the network topology 210. After the circuit generation component 265 evaluates the existing circuit information along with the demand data 205, the other network characterization data and the failure data 215, the circuit generation component 265 generates the output 310 indicting the capacities that have to be provisioned for the existing circuits. In some embodiments, the output 310 is the same as the circuits 225 of FIG. 2. The output 310 indicates that the capacities have been augmented with additional capacity for some circuits, decreased for some circuits and/or unchanged for some circuits. For example, the output 310 indicates that the circuit $C_1$ has to be provisioned with a capacity of 400 Gbps, which is an increase of 300 Gbps from its current capacity. If the maximum capacity of a circuit is 100 Gbps, e.g., constrained by the capacity of the underlying link, then the increase of 300 Gbps indicates that three new augmented circuits need to be added to the computer network 100. In some embodiments, an augmented circuit is generated such that the augmented circuit has the same terminal nodes, e.g., the source and destination nodes, as the circuit from which it is augmented but a path of the augmented circuit does not necessarily overlap with that of the circuit from which it is augmented.

In some embodiments, an increase in the capacity to be provisioned indicates that a demand in the particular circuit is expected to increase, e.g., a data center in the circuit is expected to transmit more data than it is currently transmitting. The output 310 indicates that the circuit $C_7$ has to be provisioned with a capacity of 600 Gbps, which is 600 Gbps less from its current capacity. The capacity is released to the computer network 100 and the circuit generation component 265 can use this released capacity to provision other circuits that need additional capacity.

Referring back to FIG. 2, after the capacity provisioning is completed by the circuit generation component 265, the circuits have to be assigned to specified spectral resources of the links, e.g., specified wavelengths of light supported by the fiber optic cable. The spectral resource assignment component 270 generates a spectral resources assignment 250 that includes an assignment of different circuits to different spectral resources. The spectral resource assignment component 270 has to assign each of the circuits to a specified channel or a super-channel of each of the links in the path of the circuit, for the circuit to propagate the data traffic from a source node of the circuit to the destination node of the circuit. In some embodiments, when a specified circuit is assigned to a specified spectral resource, each of the nodes in the path of the specified circuit is configured to transmit data propagated by the specified circuit using the specified spectral resource.

Spectral resources of the link are capable of transmitting a specified capacity. For example, if a fiber optic cable has 88 channels and each channel can transmit 100 Gbps, the fiber optic cable can transmit up to 8.8 Terabits per second (Tbps). A super-channel technology can increase the transmission capacity of a single link over 10 TBps.

The spectral resource assignment component 270 assigns different circuits to different spectral resources based on an objective and subject to constraints 230. In some embodiments, the objective of the spectral resource assignment component 270 is to assign each and every circuit generated by the circuit generation component 265 to one of the spectral resources subject to the constraints 230, and by finding a matching between the circuits and spectral resources so as to avoid overlaps of the circuits on the same spectral resources on any link and not exceeding routing capabilities of the nodes. The constraints 230 can be based on a node, e.g., a type of a node in the circuit, and/or on a link in the circuit. Some nodes are terminal or transit nodes—nodes at which a circuit originates or terminates, and some nodes are transit nodes—nodes through which the circuits pass but do not originate or terminate. The spectral resource assignment can differ based on the type of the node. For example, a circuit that passes through a transit type node can be assigned to only one channel or super-channel and not more. Other types of a node include a second type in which there can be one circuit passing through the node and another originating at the node, and a circuit that is passing through such a node can be assigned to only channel or super-channel, whereas a circuit that originates at the node can be assigned to any of the available spectral resources. Yet another type of node includes a quad node, which is a node at which four circuits can terminate. For a quad node, the spectral resource assignment component 270 can assign one of any four channels. Regarding link constraints, one link can have less number of spectral resources than another link in the circuit and/or may have less network capacity than the other, and therefore, the spectral resource assignment component 270 may have to assign the circuit to a specified spectral resource accordingly. Further yet, some constraints can be that a circuit may not be reassigned to other spectral resources.

As mentioned above, the network planning tool 200 can be used in Greenfield planning and/or Brownfield planning.

In the case of Greenfield planning, the spectral resource assignment component 270 assigns the circuits to any of the spectral resources of the links. In the case of Brownfield planning, the spectral resource assignment component 270 identifies and/or otherwise determines the spectral resources to which the existing circuits are assigned and then assigns the newly generated circuits to any of the remaining or available spectral resources. An example of Brownfield planning is described at least with reference to FIG. 3B below.

Figure 3B:
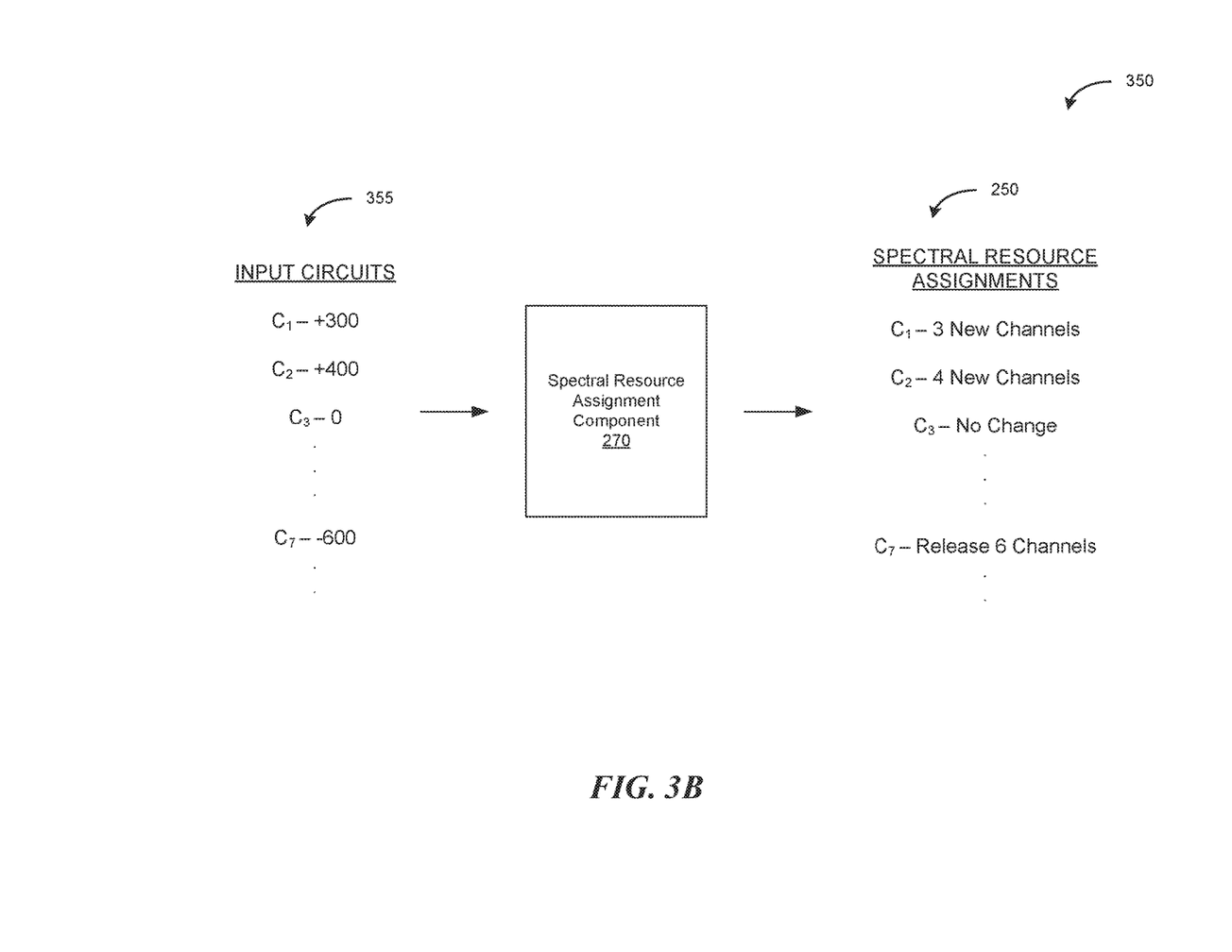
FIG. 3B is a block diagram illustrating an example of channel assignment for the circuits generated by the circuit generation component in Brownfield planning, consistent with various embodiments.

FIG. 3B is a block diagram illustrating an example 350 of channel assignment for the circuits generated by the circuit generation component 265 of FIG. 2 in Brownfield planning, consistent with various embodiments. In some embodiments, an input 355 to the spectral resource assignment component 270 is derived from the output, e.g., circuits 225 or output 310, of the circuit generation component 265. In the example 350, the input 355 to the spectral resource assignment component 270 includes capacities that are augmented to and/or decreased from the current capacities of the existing circuits. For example, the input 355 indicates that a circuit $C_1$ is augmented with 300 Gbps, $C_2$ with 400 Gbps, capacity of $C_3$ is unchanged and that of $C_7$ is decreased by 600 Gbps. Considering, for example, that a capacity of one spectral resources is 100 Gbps, the spectral resource assignment component 270 has to assign the three new circuits generated out of circuit $C_1$ to three new spectral resources, the four new circuits generated out of circuit $C_2$ to four new spectral resources and so on. Further, regarding circuit $C_7$, since its capacity is decreased, the spectral resource assignment component 270 can release some of the spectral resources assigned to $C_7$ and use the released spectral resources for assigning to different circuits. The spectral resource assignment component 270, in identifying the new spectral resources, ensures that it identifies only those channels that are not already assigned to any of the existing circuits and subject to the constraints 230. Accordingly, the spectral resource assignment component 270 can generate the spectral resources assignments 250 which include the assignment of circuits to spectral resources.

Referring back to FIG. 2, in some embodiments, if the spectral resource assignment component 270 does not meet the objective of assigning all the circuits to the spectral resources, e.g., there are some circuits in the spectral resources assignment 250 that are not assigned to any of the spectral resources, then this information is fed back to the circuit generation component 265, which regenerates the circuits based on the feedback. The circuit generation component 265 generates a different set of circuits, which are then assigned to channels by the spectral resource assignment component 270. The process of generating the circuits, assigning the circuits to the spectral resources, feeding back the circuits to the circuit generation component can be repeated until all or at least a specified number of the generated circuits are assigned to the spectral resources. For example, in regenerating the circuits, some circuits can be treated as "re-routable", e.g., their paths between the start and end nodes are subject to changing in favor of a better channel assignment.

The spectral resource assignment component 270 can use Mixed-Integer Programming (MIP) or Integer Linear Programming (ILP) model to assign the circuits to spectral resources. In some embodiments, an integer programming problem is a mathematical optimization or feasibility program in which some or all of the variables are restricted to be integers. In some embodiments, the integer programming is also referred to as ILP, in which the objective function and the constraints (other than the integer constraints) are linear. In some embodiments, a MIP is a linear programming problem where some of the decision variables are constrained to be integer values (i.e., whole numbers such as −1, 0, 1, 2, etc.) at the optimal solution. The MIP approach enables a more compact way for assigning the spectral resources whereby leaving several spectral resources available or almost available for additional circuit assignments, e.g., for augmented circuits. For example, the spectral resource assignment component 270 can use a decision variable that indicates whether a particular spectral resource is used or not. For example, a value of "1" indicates that the particular channel is assigned and a value of "0" indicates that the particular channel is unassigned, and therefore available for assignment. So, in assigning the circuits to the spectral resources, the spectral resource assignment component 270 minimizes the penalty expressed as a weighted sum of those decision variables so as to ensure that the maximum possible number of circuits are assigned to spectral resources as well leaving as many spectral resources as possible available for future assignments.

Figure 4:
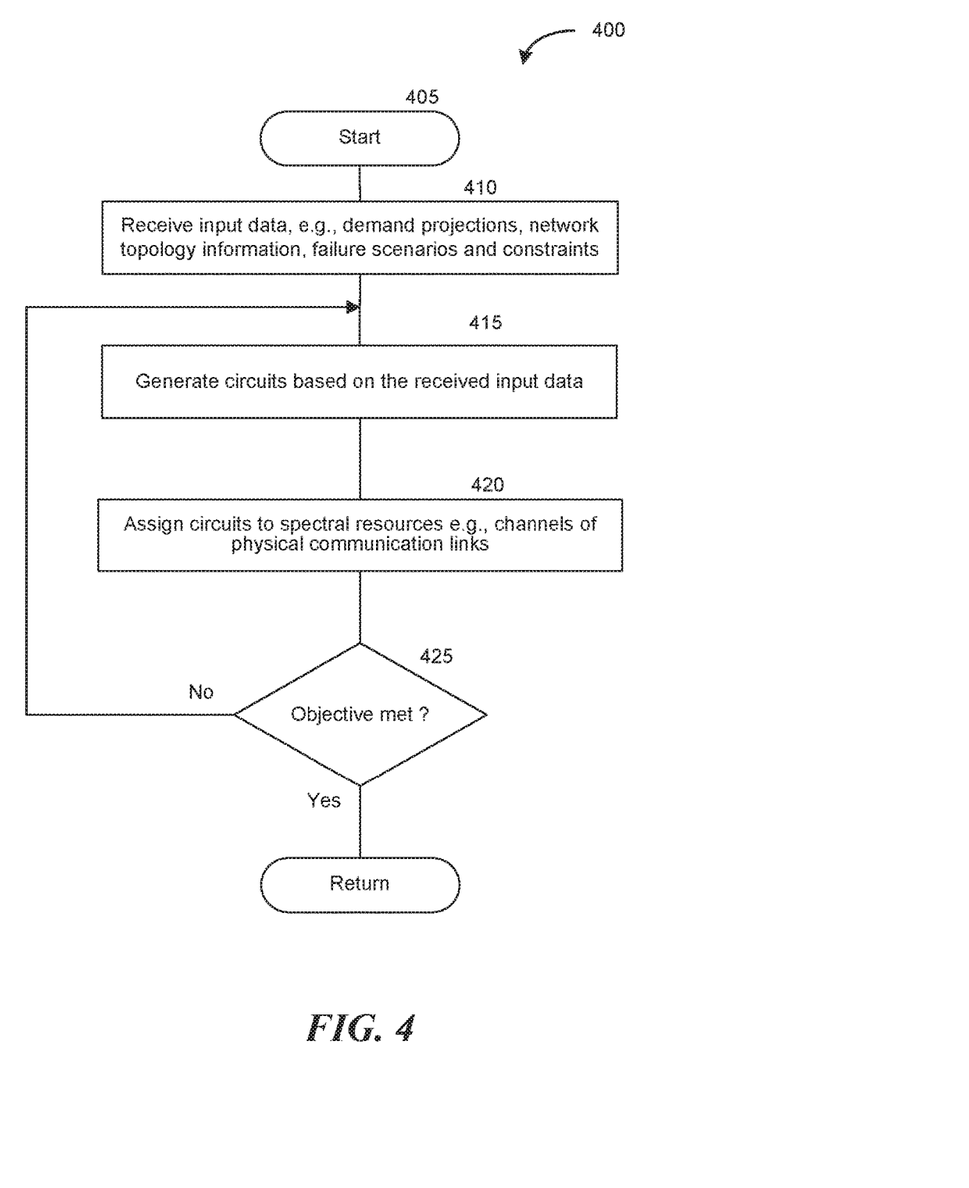
FIG. 4 is a flow diagram of a process of designing a topology of the computer network, consistent with various embodiments.

FIG. 4 is a flow diagram of a process 400 of designing a topology of a computer network of FIG. 1, consistent with various embodiments. In some embodiments, the process 400 may be implemented in the computer network 100 of FIG. 1 and using the network-planning tool 200 of FIG. 2. The process 400 begins at block 405, and at block 410, the circuit generation component 265 receives input data, e.g., demand projections, network topology information, failure scenarios and constraints. In some embodiments, the demand projections can be similar to the demand data 205, the network topology information can be similar to the network topology 210, the failure scenarios can be similar to the failure data 215 and the constraints can be similar to the constraints 220 and constraints 230. The input data may be formatted in a format for use by the network-planning tool 200. For example, the input data may be received in the form of a spreadsheet, a table, a text document of comma-separated values, or some other human-readable format utilized by users, e.g., network planners using the network-planning tool 200, which can then be formatted into an internal format for use by the network-planning tool 200. In some embodiments, the network planning tool 200 provides a graph-based application that has a graphical user interface (GUI) using which the user can draw a graph, e.g., similar to FIG. 1, representing a topology of the computer network 100. The graph-based application can provide various ways to indicate the nodes, the links, circuits, capacities of the circuits, spectral resources assigned to the circuit etc.

At block 415, the circuit generation component 265 evaluates the demand data 205, the network topology 210, the failure data 215 and the constraints 220, and generates a capacity provisioning plan, e.g., as described at least with reference to FIG. 2 and FIG. 3A. The capacity-provisioning plan includes a set of circuits, e.g., circuit 225, and a network capacity provisioned to each of the set of circuits. The network planning tool 200 can be used for Greenfield planning and/or Brownfield planning. In the case of Greenfield planning, the circuit generation component 265 generates new circuits 225 based on the input data while satisfying the constraints 220. In the case of Brownfield planning, the circuit generation component 265 can (a) augment one or more of the existing circuits with additional capacities to generate new augmented circuits, (b) decrease the capacity of one or more of the existing circuits, thereby releasing some capacity, which can also be used for provisioning the augmented circuits, or (c) leave the capacities of one or more of the existing circuits unchanged.

Each demand projection is characterized by a source node, a destination node, capacity demand between the source and destination nodes. In some embodiments, the circuit generation component 265 generates, for each demand projection, a set of alternative circuits that sustain at least the projected demand in case of any single link failure and some double or multiple link failure scenarios. In some embodiments, the set of circuits satisfies all demand projections, e.g., for any link, the capacity provided by one or more circuits is no less than the sum of network capacity demand of all demand projections. Further, the set of circuits are generated such that each demand projection has a group of circuits with terminal nodes that include the source and destination nodes with capacities exceeding or equal to the network capacity demand of the corresponding demand projection.

At block 420, the spectral resource assignment component 270 assigns each of the circuits to one of the spectral resources of the links, e.g., as described with reference to FIG. 2 and FIG. 3B. The spectral resource assignment component 270 generates the spectral resources assignments 250 based on an objective and subject to the constraints 230. In some embodiments, the spectral resource assignment component 270 uses mixed-integer programming approach to generate the spectral resource assignments, e.g., by expressing the objectives and/or constraints as integer variables.

At determination block 425, the spectral resource assignment component 270 determines whether the objective of the channel assignment has been met. For example, the objective can be to assign every circuit or at least a specified number of the circuits generated by the circuit generation component 265 to different spectral resources. If the spectral resource assignment component 270 determines that the objective has not been met, the spectral resource assignment component 270 feeds back the spectral resource assignments to the circuit generation component 265 to regenerate the circuits. In some embodiments, the process of feeding back the spectral resource assignments to the circuit generation component 265, regenerating the circuits and reassigning the circuits to the spectral resources can be repeated until the objective has been met. If the spectral resource assignment component 270 determines that the objective has been met, the process 400 returns.

Figure 5:
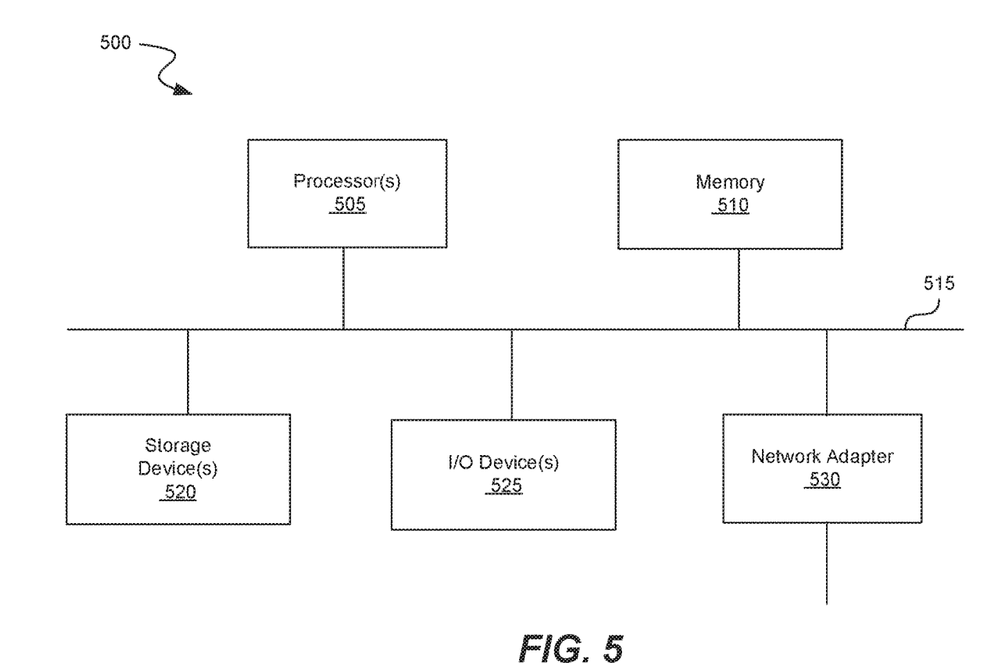
FIG. 5 is a block diagram of a processing system that can implement operations, consistent with various embodiments.

FIG. 5 is a block diagram of a computer system as may be used to implement features of the disclosed embodiments. The computing system 500 may be used to implement any of the entities, components, modules, or services depicted in the examples of the foregoing figures (and any other components and/or modules described in this specification). The computing system 500 may include one or more central processing units ("processors") 505, memory 510, input/output devices 525 (e.g., keyboard and pointing devices, display devices), storage devices 520 (e.g., disk drives), and network adapters 530 (e.g., network interfaces) that are connected to an interconnect 515. The interconnect 515 is illustrated as an abstraction that represents any one or more separate physical buses, point to point connections, or both connected by appropriate bridges, adapters, or controllers. The interconnect 515, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 510 and storage devices 520 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media).

The instructions stored in memory 510 can be implemented as software and/or firmware to program the processor(s) 505 to carry out actions described above. In some embodiments, such software or firmware may be initially provided to the processing system 500 by downloading it from a remote system through the computing system 500 (e.g., via network adapter 530).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a specified feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A computer-implemented method, comprising:
   receiving, at a computer system as input to a circuit generating component of a network planning tool, demand data having multiple demand projections for a computer network, wherein each of the multiple demand projections includes a source node in the computer network, a destination node in the computer network, and a projected network demand associated with the source node and the destination node;
   receiving, as input to the circuit generating component, topology information of the computer network, the topology information including information regarding multiple nodes and multiple physical communication links between the multiple nodes;
   receiving, as input to the circuit generating component, circuit data for multiple logical circuits in the computer network, the circuit data including, for each of the multiple logical circuits, a pair of nodes between which data is transmitted by a particular logical circuit, a network capacity of the particular logical circuit, and a path of the particular logical circuit over which data is transmitted between the pair of nodes, the path including one or more of the multiple nodes and one or more of the multiple physical communication links;
   receiving, as input to the circuit generating component, failure data regarding network failure scenarios, the failure data including, for each network failure scenario, at least one physical communication link;
   generating, by the circuit generating component, a new set of logical circuits for the computer network with bandwidths exceeding the multiple demand projections of the computer network even in case of an occurrence of one or more of the network failure scenarios;
   outputting, from the circuit generating component to a spectral resource assignment component of the network planning tool, the new set of logical circuits;
   generating, by the spectral resource assignment component, a new set of spectral resource assignments by assigning the new set of logical circuits to different spectral resources of the multiple physical communication links, wherein each of the multiple physical communication links includes multiple spectral resources in which each spectral resource transmits first data to be propagated by one of the new set of logical circuits;
   determining whether at least a specified number of logical circuits from the new set of logical circuits were assigned to a spectral resource;
   if at least the specified number of logical circuits in the new set of logical circuits were assigned to the spectral resource, outputting, from the spectral resource assignment component to a user of the network planning tool, the new set of spectral resource assignments;
   if less than the specified number of logical circuits in the new set of logical circuits were assigned to the spectral resource:
      feeding back, from the spectral resource assignment component to the circuit generating component, information about the new set of spectral resource assignments; and
      generating, by the circuit generating component based at least in part on the information about the new set of spectral resource assignments, an additional new set of logical circuits for the computer network with bandwidths exceeding the multiple demand projections of the computer network even in case of the occurrence of the one or more of the network failure scenarios; and
   using at least one of the new set of logical circuits, the new set of spectral resource assignments, or the additional new set of logical circuits to generate a capacity-provisioning plan comprising guidance regarding how capacity of the computer network should be provisioned from the multiple physical communication links.

2. The computer-implemented method of claim 1, wherein the new set of logical circuits comprises a first logical circuit of the multiple logical circuits with additional network capacity.

3. The computer-implemented method of claim 1, wherein generating the new set of logical circuits comprises generating an additional logical circuit to satisfy additional network capacity in an event the additional network capacity exceeds a maximum network capacity of a first logical circuit of the multiple logical circuits.

4. The computer-implemented method of claim 3, wherein generating the additional logical circuit includes:
   identifying a first pair of nodes between which the first logical circuit is generated, and
   generating the additional logical circuit between the first pair of nodes, wherein a path of the additional logical circuit is different from a path of the first logical circuit.

5. The computer-implemented method of claim 1, wherein generating the new set of logical circuits includes decreasing a network capacity of a second logical circuit of the multiple logical circuits by a specified value, the new set of logical circuits comprising the second logical circuit.

6. The computer-implemented method of claim 5 further comprising:
   using the network capacity released from the second logical circuit to generate another one of the new set of logical circuits.

7. The computer-implemented method of claim 1, wherein generating the new set of logical circuits includes at least one of:

determining to augment a first logical circuit of the multiple logical circuits with additional network capacity, or determining to decrease a network capacity of the first logical circuit by a specified value.

8. The computer-implemented method of claim 1, wherein generating the new set of logical circuits further includes generating the new set of logical circuits which satisfies a network constraint.

9. The computer-implemented method of claim 8, wherein the network constraint indicates that a latency of the computer network is to be below a specified value.

10. The computer-implemented method of claim 8, wherein the network constraint indicates that a power consumption by the computer network is to be below a specified value.

11. The computer-implemented method of claim 1, wherein assigning the new set of logical circuits to the different spectral resources of the multiple physical communication links comprises assigning different logical circuits in the new set of logical circuits to different channels of the multiple physical communication links, wherein each of the multiple physical communication links includes multiple channels in which each channel transmits second data to be propagated by one of the multiple logical circuits.

12. The computer-implemented method of claim 11, wherein assigning the different logical circuits to the different channels includes assigning a first logical circuit of the new set of logical circuits to a specified channel of the multiple channels, wherein the first logical circuit transmits third data from a first specified node to a second specified node using the specified channel.

13. The computer-implemented method of claim 12, wherein assigning the first logical circuit to the specified channel includes configuring each of a set of nodes in a path of the first logical circuit to transmit the third data propagated by the first logical circuit using the specified channel.

14. The computer-implemented method of claim 11, wherein assigning the different logical circuits to the different channels includes determining a specified channel to be assigned to a specified logical circuit based on a type of a set of nodes in a path of the specified logical circuit, wherein at least one node of the set of nodes is not assignable to more than one of the multiple channels.

15. The computer-implemented method of claim 11, wherein assigning the different logical circuits to the different channels includes determining a specified channel to be assigned to a specified logical circuit based on a number of available channels of each of the multiple physical communication links in a path of the specified logical circuit and a network capacity of the each of the multiple physical communication links.

16. A computer-readable storage medium storing computer-readable instructions, comprising:

instructions for receiving, at a computer system as input to a circuit generating component of a network planning tool, demand data having multiple demand projections for a computer network, wherein each of the multiple demand projections includes a source node in the computer network, a destination node in the computer network, and a projected network demand associated with the source node and the destination node;

instructions for receiving, as input to the circuit generating component, topology information of the computer network, the topology information including information regarding multiple nodes and multiple physical communication links between the multiple nodes;

instructions for receiving, as input to the circuit generating component, circuit data for multiple logical circuits in the computer network, the circuit data including, for each of the multiple logical circuits, a pair of nodes between which data is transmitted by a particular logical circuit, a network capacity of the particular logical circuit, and a path of the particular logical circuit over which the data is transmitted between the pair of nodes, the path including one or more of the multiple nodes and one or more of the multiple physical communication links;

instructions for receiving, as input to the circuit generating component, failure data regarding network failure scenarios, the failure data including, for each network failure scenario, at least one physical communication link;

instructions for generating, by the circuit generating component, a new set of logical circuits with bandwidths exceeding the multiple demand projections of the computer network even in case of an occurrence of one or more of the network failure scenarios;

instructions for outputting, from the circuit generating component to a spectral resource assignment component of the network planning tool, the new set of logical circuits;

instructions for generating, by the spectral resource assignment component, a new set of spectral resource assignments by assigning the new set of logical circuits to different spectral resources of the multiple physical communication links, wherein each of the multiple physical communication links includes multiple spectral resources in which each spectral resource transmits first data to be propagated by one of the new set of logical circuits;

instructions for determining whether at least a specified number of logical circuits from the new set of logical circuits were assigned to a spectral resource;

instructions for outputting, from the spectral resource assignment component to a user of the network planning tool, the new set of spectral resource assignments if at least the specified number of logical circuits in the new set of logical circuits were assigned to the spectral resource;

instructions for feeding back, from the spectral resource assignment component to the circuit generating component, information about the new set of spectral resource assignments if less than the specified number of logical circuits in the new set of logical circuits were assigned to the spectral resource;

instructions for generating, by the circuit generating component based at least in part on the information about the new set of spectral resource assignments, an additional new set of logical circuits for the computer network with bandwidths exceeding the multiple demand projections of the computer network even in case of the occurrence of the one or more of the network failure scenarios; and instructions for using at least one of the new set of logical circuits, the new set of spectral resource assignments, or the additional new set of logical circuits to generate a capacity-provisioning plan comprising guidance regarding how capacity of the computer network should be provisioned from the multiple physical communication links.

17. The computer-readable storage medium of claim 16, wherein the instructions for generating the new set of logical circuits include:

instructions for determining, based on the topology information, if the computer network includes a collection of logical circuits, and responsive to a determination that the computer network includes the collection of logical circuits, instructions for determining the new set of logical circuits by:

determining to augment a first logical circuit of the collection of logical circuits with additional network capacity, or determining to decrease a network capacity of the first logical circuit by a specified value.

18. The computer-readable storage medium of claim 16, wherein the instructions for assigning the new set of logical circuits to the different spectral resources of the multiple physical communication links include:

instructions for determining, based on the topology information, if the computer network includes a collection of logical circuits, and responsive to a determination that the computer network includes the collection of logical circuits, instructions for determining a set of the multiple spectral resources that are not assigned to the collection of logical circuits and assigning the set of the spectral resources to the new set of logical circuits.

19. A system, comprising:

a first component, stored in memory, configured to:

generate, for a computer network having multiple nodes, a new set of logical circuits with bandwidths that exceed multiple demand projections of the computer network under multiple network failure scenarios, wherein each of the new set of logical circuits transmits data from a first node of the multiple nodes to a second node of the multiple nodes via a set of the multiple nodes, wherein the new set of logical circuits are generated based on the multiple demand projections of the computer network, topology information of the computer network and failure data of the computer network, wherein each of the multiple demand projections includes a source node in the computer network, a destination node in the computer network, and a projected network demand associated with the source node and the destination node, wherein the topology information includes information regarding a layout of the multiple nodes and multiple physical communication links between the multiple nodes, and wherein the failure data includes information regarding the multiple network failure scenarios, wherein each network failure scenario includes at least one physical communication link; and output, to a second component, the new set of logical circuits;

the second component, stored in the memory, configured to:

assign the new set of logical circuits to different spectral resources of the multiple physical communication links, wherein each of the multiple physical communication links includes multiple spectral resources in which each spectral resource transmits first data to be propagated by one of the new set of logical circuits;

determine whether at least a specified number of logical circuits from the new set of logical circuits were assigned to a spectral resource;

if at least the specified number of logical circuits in the new set of logical circuits were assigned to the spectral resource, output, from spectral resource assignment component to a user of a network planning tool, a new set of spectral resource assignments; and if less than the specified number of logical circuits in the new set of logical circuits were assigned to the spectral resource, feed back, to the first component, information about the new set of spectral resource assignments, wherein the first component is further configured to generate, based at least in part on the information about the new set of spectral resource assignments, an additional new set of logical circuits for the computer network with bandwidths exceeding the multiple demand projections of the computer network even in case of an occurrence of one or more of the multiple network failure scenarios; and a third component, stored in the memory, configured to use at least one of the new set of logical circuits, the new set of spectral resource assignments, or the additional new set of logical circuits to generate a capacity-provisioning plan comprising guidance regarding how capacity of the computer network should be provisioned from the multiple physical communication links; and at least one physical processor that executes the first component, the second component, and the third component.

* * * * *